United States Patent [19]

Rosheim

[11] Patent Number: 5,692,412
[45] Date of Patent: Dec. 2, 1997

[54] ROBOTIC MANIPULATOR

[75] Inventor: Mark E. Rosheim, St. Paul, Minn.

[73] Assignee: Ross-Hime Designs, Incorporated, St. Paul, Minn.

[21] Appl. No.: 636,682

[22] Filed: Apr. 23, 1996

Related U.S. Application Data

[63] Continuation of Ser. No. 152,677, Nov. 15, 1993.

[51] Int. Cl.[6] .............................. B25J 17/02; G05G 11/00
[52] U.S. Cl. ................... 74/490.05; 74/490.01; 901/28
[58] Field of Search ............................... 901/23, 28, 29; 414/729; 74/490.01, 490.03, 490.05

[56] References Cited

U.S. PATENT DOCUMENTS

| 3,792,782 | 2/1974 | Melton | 214/1 BD X |
|---|---|---|---|
| 4,551,061 | 11/1985 | Olenick | 414/735 |
| 4,568,311 | 2/1986 | Miyake | 464/109 |
| 4,621,965 | 11/1986 | Wilcock | 414/7 |
| 4,729,253 | 3/1988 | Rosheim | 74/479 |
| 4,821,594 | 4/1989 | Rosheim et al. | 74/479 |
| 4,954,952 | 9/1990 | Ubhayakar et al. | 364/513 |
| 4,964,062 | 10/1990 | Ubhayakar et al. | 364/513 |
| 5,036,724 | 8/1991 | Rosheim | 74/479 |
| 5,239,883 | 8/1993 | Rosheim | 74/479 BP |

FOREIGN PATENT DOCUMENTS 2 145 691  4/1985  United Kingdom.

OTHER PUBLICATIONS

P. 50 of *Automobiles 1906*, By Charles E. Duryea, reprinted 1989 by Lindsay Publications Inc.

P. 94 of *Teleoperators and Human Augmentation*, An AEC-NASA Technology Survey, by Edwin G. Johnsen and William R. Corliss, published Dec. 1967.

Article entitled *A Generalized Modular Architecture for Robot Structures*, by Delbert Tesar and Michael S. Butler, published on Mar. 30, 1989.

*Primary Examiner*—Charles A. Marmor
*Assistant Examiner*—Troy Grabow
*Attorney, Agent, or Firm*—Kinney & Lange, P.A.

[57] ABSTRACT

A mechanical manipulator having actuators therein operating across orthogonal pivot joints formed between pivot connection structures and a link arrangement, and also between these same pivot connection structures and a corresponding effector. The actuators are coupled to effectors to position them as selected by having portions of such actuators coupled to the effectors that are capable of moving toward and away from other portions of such actuators connected to the link structure. The components of the mechanical manipulator, except for portions of the effectors, can be enclosed so as to allow the effectors to move in response to the actuators while excluding foreign matter from the enclosed portion thereof.

28 Claims, 11 Drawing Sheets

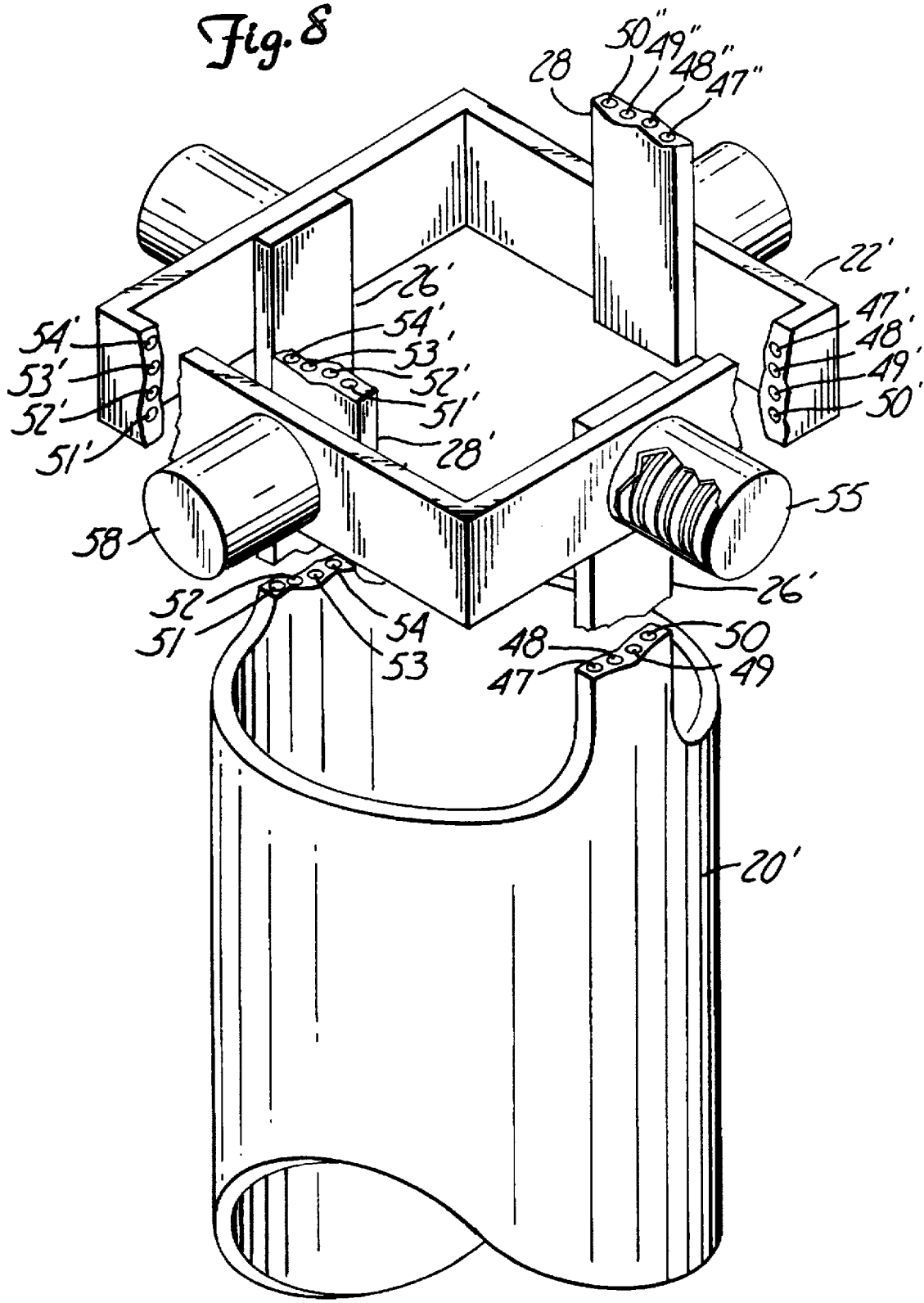

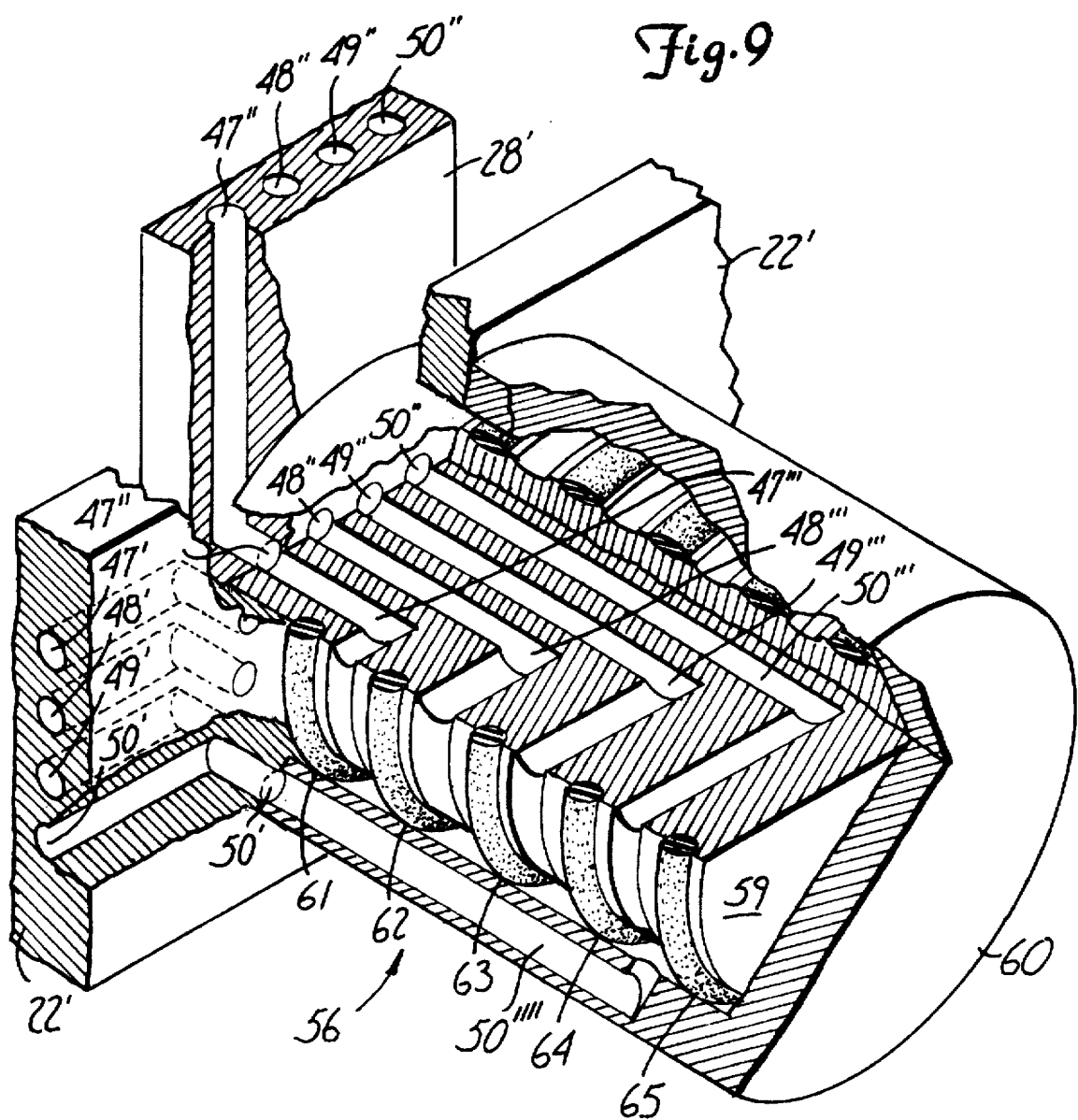

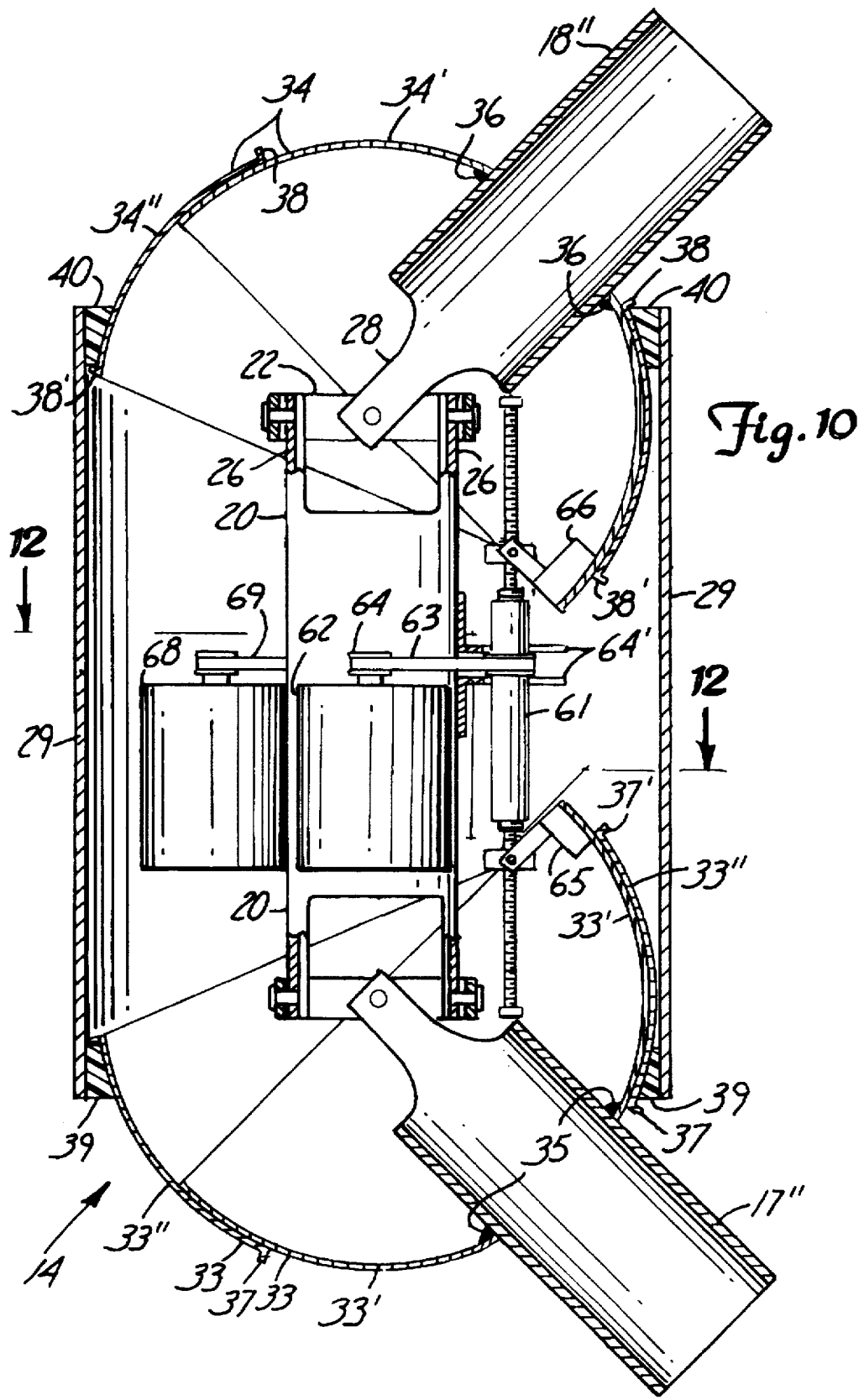

ROBOTIC MANIPULATOR

This is a continuation of application Ser. No. 08/152,677, filed Nov. 15, 1993.

BACKGROUND OF THE INVENTION

The present invention relates to controlled motion mechanical members used as a mechanical manipulator and, more particularly, to a motion controllable mechanical manipulator which is in modular form insofar as having its actuation members contained therein.

A strong desire for increased automation in the workplace, a need for remotely operable mechanical manipulators, along with an increased ability to control such mechanical manipulators, has led to substantial efforts in the development of robotics. As a result, substantial advances have occurred in many aspects of robotics.

One aspect permeating robotics is the controlling of mechanical manipulators, the portion of a robot used to change positions or orientations of selected objects. Ultimately, such manipulators are desired to have capabilities similar to those of a human joint such as a shoulder or wrist, perhaps in support of a hand-like appendage, which could provide capabilities similar to that of a human arm or better.

Providing a mechanical manipulator simulating a human joint presents a difficult design problem. Such a joint can be considered to have up to 3 degrees of freedom in the motion possibilities available to it. A number of different kinds of mechanical joints for use as mechanical manipulators have been proposed which attempt to exhibit 3 degrees of freedom, and some of these have actually achieved such a capability. Typically, such a joint has a base of some sort to which one side of the joint is fastened, and extending from which a force imparting arrangement is provided to operate movable members located in this fastened portion of the joint. Mechanical transmission arrangements then couple this motion on this fastened side of the joint to the controlled side of the joint to cause that joint portion to correspondingly move. Mechanical transmission arrangements so operating the controlled side of the joint have been of many kinds, including gears.

However, such joints thus require a mechanical connection arrangement to control motion of the controlled side of the joint. This is disadvantageous in several respects especially where more than one such joint is used in a train in a structure because a mechanical control arrangement would have to pass through a first joint before being able to operate the controlled side of a following second joint. To overcome this difficulty, electrical motors have been installed in the connection structure between two such joints so that the second joint at least can be controlled by motor driven actuators to provide the selected motion of the controlled side of the joint, thus relieving the need to provide a mechanical connection extending through more than one joint. Such an arrangement, while workable, results in having a rigid connection structure between the two joints which effectively places some constraints on the bending radius which can be achieved by the structure considered in its entirety. Thus, a joint is desired which does not require unduly long interconnection portions to be connected thereto to house locally provided actuators therefor, particularly interconnection portions between successive joint member used in a train of such joints.

SUMMARY OF THE INVENTION

The present invention provides a mechanical manipulator having a pair of manipulable supports on different sides thereof. A link arrangement is connected to each of these supports by a corresponding orthogonal pivot connection structure such that (a) each of the pivot connection structures is rotatably connected to the link arrangement so as to be rotatable about a corresponding axis established by its rotatable connections, and such that (b) each of these pivot connection structures is also rotatably connected to the corresponding one of the manipulable supports so that each support is rotatable about a corresponding axis established by its rotatable connections. The rotatable connection axis involving the manipulable support for each such pivot connection structure is orthogonal to the axis involved in the rotatable connection between that structure and the link arrangement. Linear actuators are coupled to the link arrangement and to a corresponding one of the manipulable supports, these actuators having the portions thereof so coupled to the link and to a corresponding support being capable of selectively approaching or separating from one another.

The actuators can be linear actuators or, alternatively, a motor driven differential screw. The coupling between the supports and the linear actuators can be formed by a shell that can be moved with respect to an enclosure that is provided about the link arrangement that otherwise exposes the manipulable supports. An interior passageway can be maintained between and through the supports to permit cabling, hoses, and the like to extend through the manipulator.

BRIEF DESCRIPTION OF THE DRAWINGS

FIG. 8 shows a fragmentary view of an alternative of a portion of the apparatus of FIG. 7;

FIG. 9 shows a cutaway pictorial view of a portion of the apparatus of FIG. 8;

FIG. 10 shows a cross-section view of an alternative for that portion of the apparatus of FIG. 1;

DETAILED DESCRIPTION OF THE PREFERRED EMBODIMENTS

Figure 1:
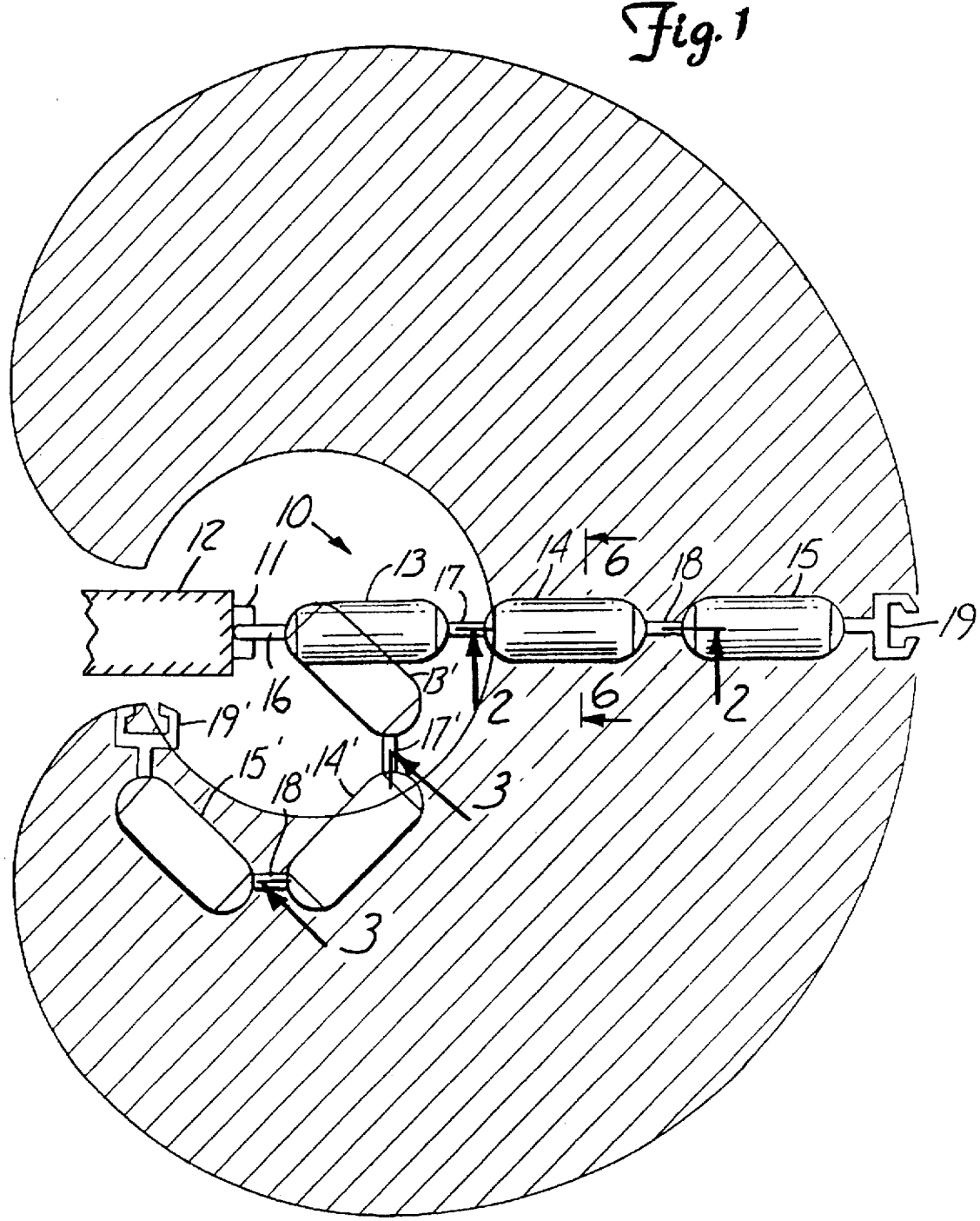
FIG. 1 shows a mechanical manipulator embodying the present invention.

FIG. 1 shows a mechanical manipulation system, 10, which bears some similarities to a human arm but which can be operated more flexibly than a human arm, even appearing as serpentine-like. Mechanical manipulation system 10 is shown in an extended, unbent position in FIG. 1 extending left to right from a base, 11, supported on some structure, 12, and having therein three mechanical manipulators, or joints, 13, 14, and 15, the choice of three being arbitrary as more or fewer joints could be included in the system. System 10 further has manipulable supports or effectors, 16, 17, 18, and 19, extending from the opposite ends of corresponding ones of joints 13, 14 and 15, support 16 extending to base 11, supports 17 and 18 extending between corresponding pairs of these joints, and support 19 extending to form a mount for an arbitrarily chosen end tool. Support, or effector, 16 extending from joint 13 to base 11, and tool mount support, or effector, 19 are each involved with the operation of just a single joint, joints 13 and 15, respectively. Supports, or effectors, 17 and 18, however, as indicated above, connect pairs of joints, support 17 connecting joints 13 and 14 and support 18 connecting joints 14 and 15.

Mechanical manipulation system 10 is also shown in an alternative bent or "coiled" position in FIG. 1, and in this position the numerical designations for the components remain the same as they were in the unbent position, except that those which have changed position in enabling system 10 to reach the bent position have a prime symbol added thereto. The bent position taken by system 10 is one resulting from causing each support, or effector, to reach the greatest angular difference between it and the axis of the joint, or joints, to which it is connected in an arbitrary plane, a plane which could be considered to be either a vertically oriented plane or a horizontally oriented plane in FIG. 1 depending whether the view is taken as an elevation view or a plan view.

As can be seen, keeping the lengths of the supports 17 and 18, or 17' and 18', as short as possible, and doing the same for the joints involved, allows the smallest possible bending radius for mechanical manipulation system 10 in the "coiled" position. Thus, there is a significant advantage to keeping the motion generating means, or actuators, for joints 13 through 15 located elsewhere than in, or on, supports 16 through 18, i.e. placing them in the interior of joints 13 through 15 if they are not lengthened too greatly thereby. Thus, locating them there, the motion generating means, or actuators, for orientating the manipulable supports of a joint with respect to the axis of the joint, should also be kept as compact as possible to aid in keeping the joint relatively small to thereby achieve a sharper bending radius for the coiled mechanical manipulation system. The crosshatched area in FIG. 1 shows the range of motion possible in the chosen plane of mechanical manipulation system 10.

Figure 2:
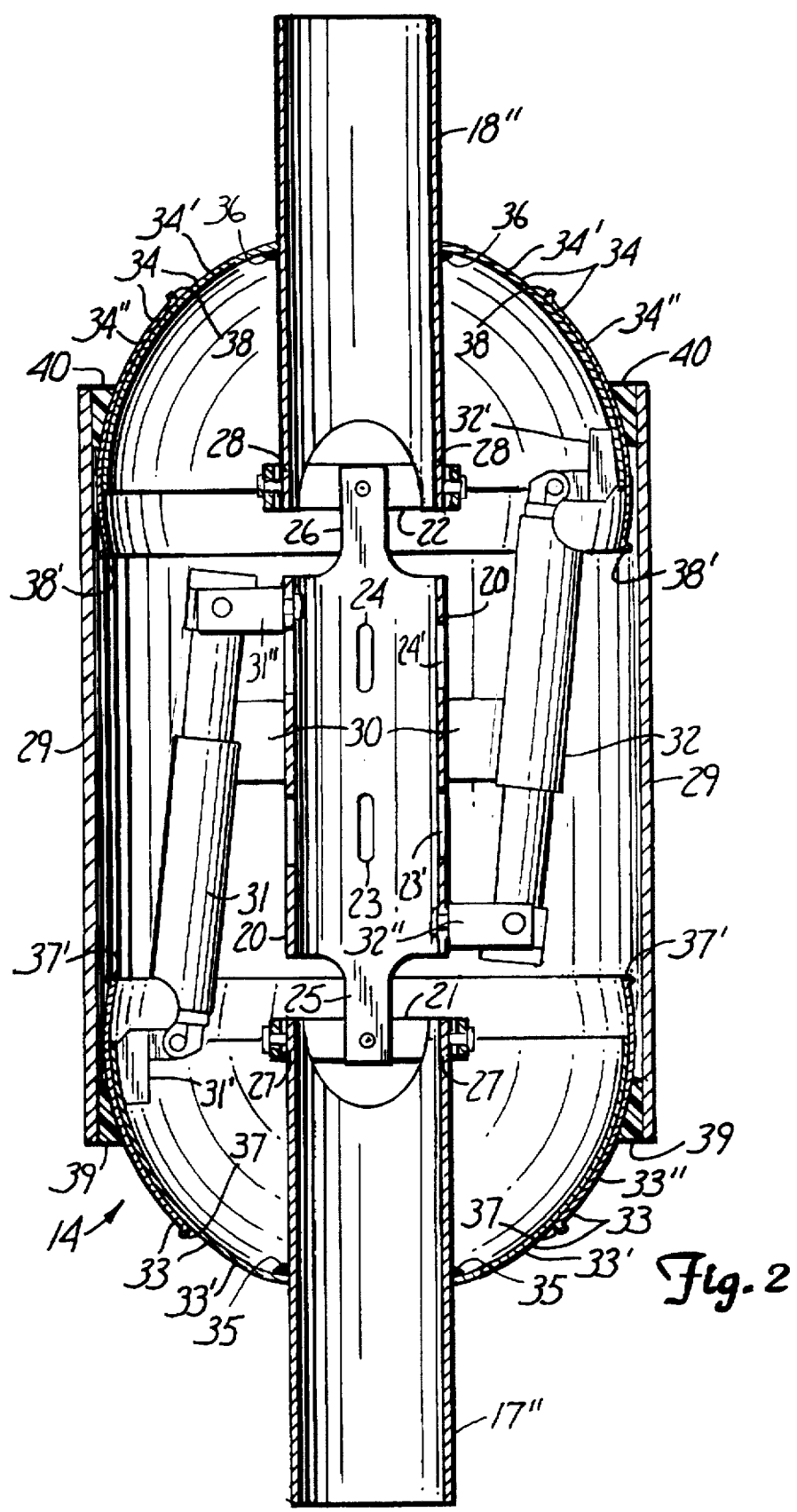
FIGS. 2 and 3 show cross-section views of a portion of the apparatus of FIG. 1.

FIG. 2 shows a longitudinal cross section view representative of each of joints 13, 14 and 15 (although they all do not necessarily have to be exactly the same type or size joint in system 10) with joint or mechanical manipulator 14 being chosen as the actual example. A portion of first designated manipulable support 17, shown as a portion of a tube, extends downward in FIG. 2, and outward from joint 14, this initial support portion being designated 17" in that figure. Similarly, a portion of complementary manipulable support 18, also shown as a portion of a tube, extends upward in FIG. 2, and again outward from joint 14, this complementary support portion being designated 18" in that figure.

Support portion 17" and support portion 18" are linked to one another by a central link structure, 20, as a base for each and a pair of orthogonal pivot structures, or connectors 21 and 22, all typically formed of stainless steel. Central link structure 20 is shown as an elongated tube having a pair of openings, 23 and 24, in the wall thereof to permit passing of control interconnection means therethrough, and further having pairs of wall extensions, 25 and 26, at opposite ends thereof. Each extension pair at a corresponding end of central link structure 20 has each of its members formed from a corresponding portion of the tubular wall of that structure, each such portion extending past what is otherwise the end of most of that tubular wall to thereby face one another across the open tubular passageway therebetween, there as a result being a valley in the tube wall on either side of each extension of the pair separating each member from the opposite member of that pair. Each member of extension pair 25 is rotatably connected to orthogonal pivot structure 21 positioned therebetween so that structure 21 can rotate with respect to central link structure 20, with one side or the other of structure 21, between the sides thereof connected to extension pair 25, being in one of the valley openings between extensions 25 when that pivot structure is pivoted about the rotatable connection between it and extension 25. A duplicate of that arrangement is used to rotatably connect orthogonal pivot structure 22 to each of the pair of central link structure extension members 26 with structure 22 similarly being positioned between extensions 26.

Orthogonal pivot structures 21 and 22 are each formed in a closed loop structure in having a closed wall around an interior passageway, that is, each such structure appears much like a truncated tube of a selected cross section. Although various cross section designs could be used for these structures, the walls of orthogonal pivot structures 21 and 22 have been chosen to be rectangular, or square. Thus, two opposite and parallel sides of orthogonal pivot structure 21 are the sides thereof rotatably connected to central link structure extensions 25 as described above and, similarly as describe above, two opposite and parallel sides of orthogonal pivot structure 22 are the sides thereof rotatably connected to central link structure extensions 26.

Orthogonal pivot structure 21, as a result, has two further parallel and opposite sides therein, these being connected in a rotatable connection to a pair of wall extensions, 27, of support portion 17" with each of the members of this pair again formed from a corresponding portion of the tubular wall of that structure by having each such portion extend past what is otherwise the end of most of that tubular wall to thereby face one another across the open tubular passageway therebetween. As a result, there is a valley in the tube wall on either side of each extension member of the pair separating each member from the opposite member of that pair, and which can accommodate rotation of support portion 17" through allowing sides of pivot structure 21 to intrude therein during such rotation. As a result, considering this connecting of support portion 17" to central link structure 20 initial support portion 17" and initial orthogonal pivot structure 21 can pivot together with respect to the axis of tubular central link structure 20 in the elongated direction thereof, and support portion 17" can further pivot with respect to orthogonal pivot structure 21 and the axis of link structure 20.

In the same way, the two remaining opposite and parallel sides of pivot structure 22 are rotatably connected to a pair of wall extensions, 28, of support portion 18". Thus, considering the connecting of support portion 18" and central link structure 20, complement support portion 18" and complement orthogonal pivot structure 22 can together pivot with respect to the axis of link structure 20, and support structure 18" can further pivot with respect to orthogonal pivot structure 22 and the axis of link structure 20.

Such pivoting possibilities for manipulable support portions 17" and 18" allow the ends thereof to be positioned anywhere on a corresponding spherical surface portion which is limited in extent by the length of these support portions, and by each of them encountering obstacles to pivoting further at sufficiently large angles between the axis of each in the elongated direction thereof and the axis of link structure 20. These obstacles form the limits on the edges of the corresponding spherical surface portion, and are imposed by the presence of an outer tubular joint enclosure, 29, attached by brackets, 30, to link structure 20. Brackets 30 are fastened at one end thereof by screws to enclosure 29 with the other ends of these brackets being welded to link structure 20. Such moving of either support portion 17" or 18" to a desired position on its corresponding spherical surface portion is generated and controlled by a corresponding pair of linear actuators, these linear actuators being coupled at one end thereof to central link structure 20 by a rotatable connection arrangement, and coupled at the other end to the corresponding one of support portions 17" and 18".

Thus, in FIG. 2, one of each of the pair of linear actuators associated with support portions 17" and 18" is shown with the other of each of these pairs either (a) omitted because of the section removed in FIG. 2 to provide the cross section view, or (b) unseen because of being obscured by central link structure 20. Support portion 17" has one initial linear actuator, 31, coupled to it. Similarly, support portion 18" has one complement linear actuator, 32, coupled to it. Linear actuator 31 is coupled to support portion 17" through being rotatably connected to a movable spherical shell portion arrangement, 33, having a hole therein through which support portion 17" protrudes. Similarly, linear actuator 32 is coupled to support portion 18" by being rotatably connected to a further movable spherical shell portion arrangement, 34, which in turn has an opening therein through which support portion 18" protrudes. Thus, when either of movable spherical shell portion arrangements 33 or 34 are forced to move by corresponding ones of linear actuators 31 and 32, respectively, the support portion protruding therethrough is forced to also move by pivoting as described above in response to forces from the edges of the corresponding movable spherical shell portion arrangement forming the hole through which it protrudes.

Movable spherical shell portion arrangement 33 is formed by two stainless steel spherical shell portions, an inner spherical shell portion, 33', to which linear actuator 31 is directly connected by a mount and pivot pin arrangement, 31', and an outer spherical shell portion, 33". These shell portions are positioned concentrically with respect to, and in contact with, one another such that each can slide over the other within limits which is aided by providing on the sliding surfaces through high pressure spraying a thin (0.5 μm) tungsten disulfide film sold under the mark DICRONITE® by Lubrication Sciences, Inc. Each of spherical shell portions 33' and 33" is truncated just past the equator of the spherical surface about which it is formed, and each has an interior hole therethrough but with outer shell portion 33" having a much larger one than does inner shell portion 33'. Inner shell portion 33' instead has the edges of its hole snugly fitted about support portion 17" protruding therethrough to permit coupling forces thereto without initial large impacts, and these edges are shown held there by a weld, 35, made to support portion 17" for situations where sealing the interior of joint 14 from the external atmosphere is important. A pair of spaced apart snap rings could instead be used to capture these edges in the space therebetween in situations where sealing the interior of joint 14 from the external atmosphere is not as important as keeping costs as low as possible.

Movable spherical shell portion arrangement 34 is formed in a like manner by two similar concentric stainless steel spherical shell portions also in contact with one another at thin-film protected surfaces such that each can slide on the other, an inner spherical shell portion, 34' to which linear actuator 32 is directly connected by a mount and pivot pin arrangement, 32', and an outer spherical shell portion, 34", which are substantially duplicates of inner and outer spherical shell portions 33' and 33", respectively. Also substantially duplicated here is the arrangement for coupling movable spherical shell portion arrangement 33 with stainless steel support portion 17" in coupling movable spherical shell portion arrangement 34 with stainless steel support portion 18", again shown using a weld, 36, between inner spherical shell portion 34' and support portion 18" to obtain a good seal. Alternatively, a pair of spaced apart snap rings would again be used if a cheaper construction is desired.

The truncation edge and the interior hole edge of outer spherical shell portion 33" each have an outwardly directed lip formed thereat, 37 and 37', as does outer spherical shell portion 34" with similarly located lips, 38 and 38'. Lips 37 and 37' can each engage an opposite one of a pair of stop surfaces of a seal, 39, typically formed of a fluorocarbon polymer material sold under the mark TEFLON® by E. I. DuPont de Nemours & Co, which is provided on the interior surface of enclosure 29 at the edge thereof between these lips and between that enclosure and outer spherical shell portion 33". Outer spherical shell portion 33" can be slid along the sliding face surface of seal 39 that it is against, a surface located between and intersecting its two stop surfaces, but only so far as is permitted by either one of lips 37 and 37' engaging a corresponding one of these stop surfaces. Seal 39 supported by enclosure 29, and with lip 37 pressed thereagainst, together form the obstacle indicated above to limit the angular excursion of support portion 17" from the axis of link structure 20. Support portion 17" is shown at one angular excursion limit imposed by this limiting arrangement in the longitudinal cross section view of FIG. 3, and at another in the longitudinal cross section view of FIG. 4 in which the cross section view is taken at a right angle with respect to the cross section view in FIG. 3 to reveal the two remaining linear actuators used, 41 and 42, with initial actuator 41 being directly connected to inner spherical portion 33' by a mount and pivot pin arrangement, 41', and with complement actuator 42 being directly connected to inner spherical portion 34' by a mount and pivot pin arrangement, 42'. As was done with linear actuators 31 and 32, actuators 41 and 42 have the opposite ends thereof rotatably connected to central link structure 20.

Similarly, lips 38 and 38' can each engage an opposite one of a pair of stop surfaces of a seal, 40, formed of the same material and provided between enclosure 29 and outer spherical shell portion 34". Here too, seal 40 is provided on the interior surface of enclosure 29 at the edge thereof between these lips. Outer spherical shell portion 34" can be slid along the sliding face surface of seal 40 that it is against, also a surface located between and intersecting its two stop surfaces, but only so far as is permitted by either one of lips 38 and 38' engaging a corresponding one of these stop surfaces. Seal 40 supported by enclosure 29, and with lip 38 pressed thereagainst, together form the obstacle indicated above to limit the angular excursion of support portion 18" from the axis of link structure 20. As was shown for support portion 17", support portion 18" is shown at one angular excursion limit imposed by this limiting arrangement in FIG. 3, and at another in FIG. 4. A further view of this FIG. 3 position of support portion 18" (and to an extent of support portion 17") is provided in the perspective view of FIG. 5.

Figure 3:
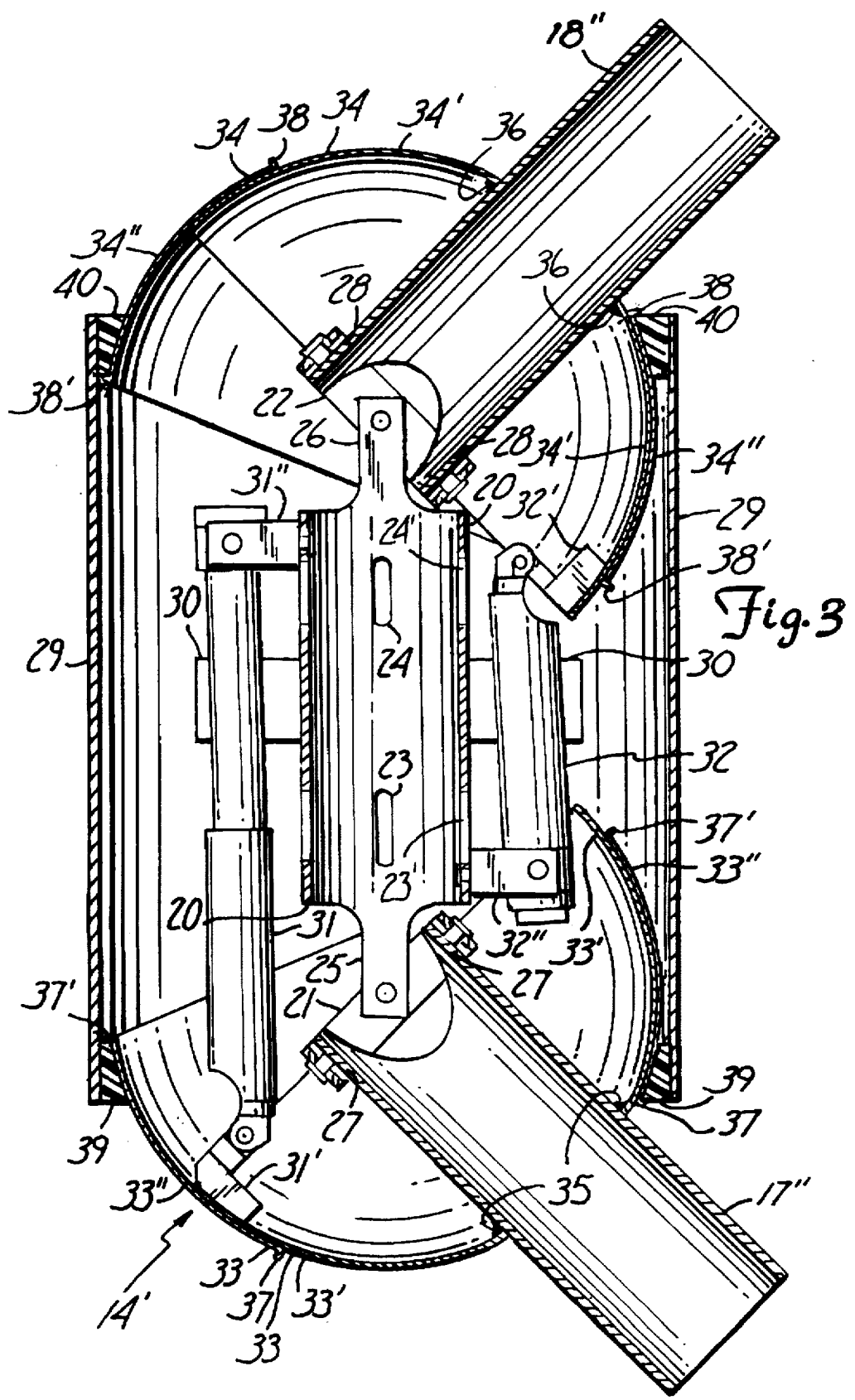
Figure 4:
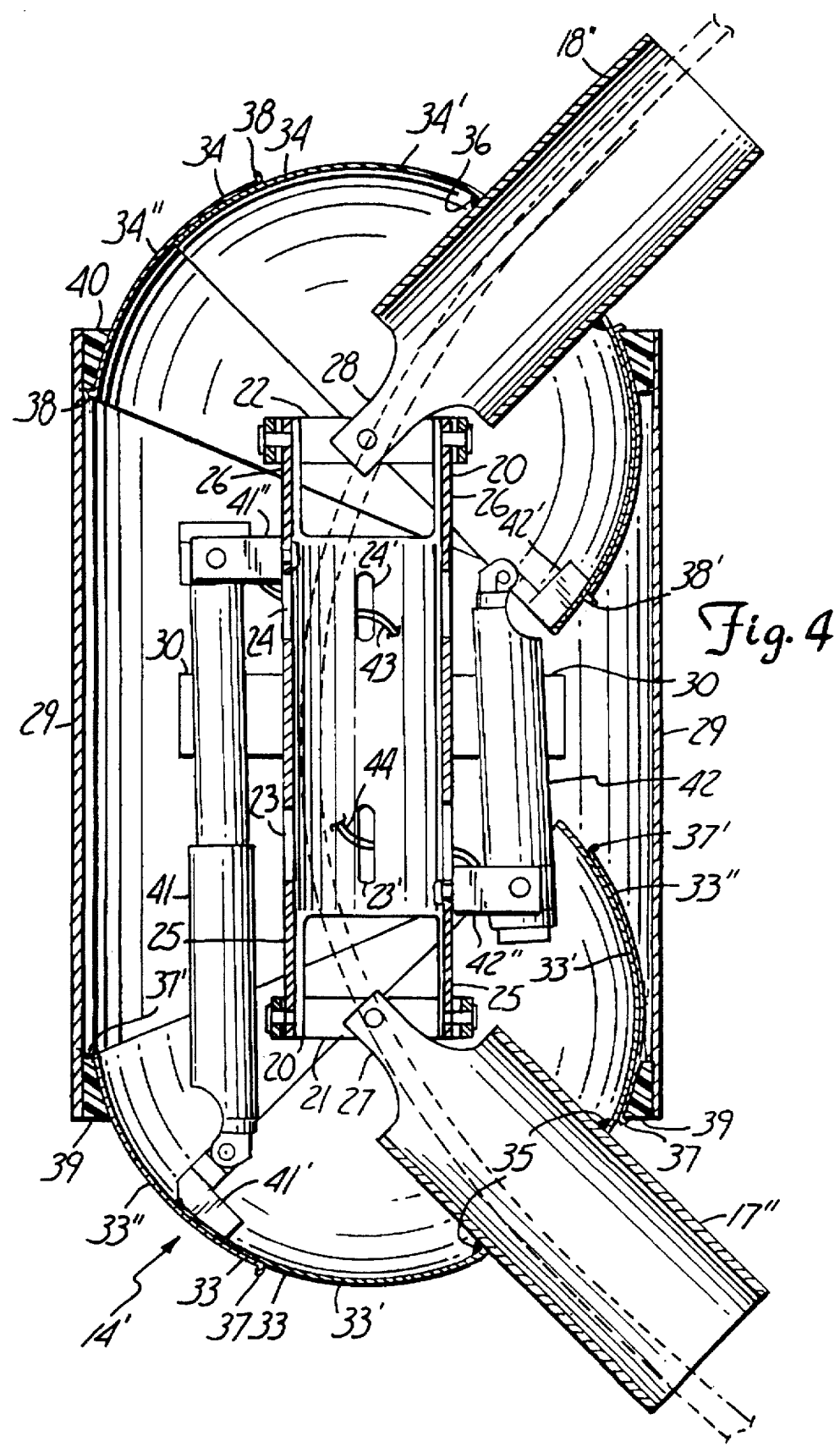
FIG. 4 shows another cross-section view of the apparatus of FIGS. 2 and 3.
Figure 5:
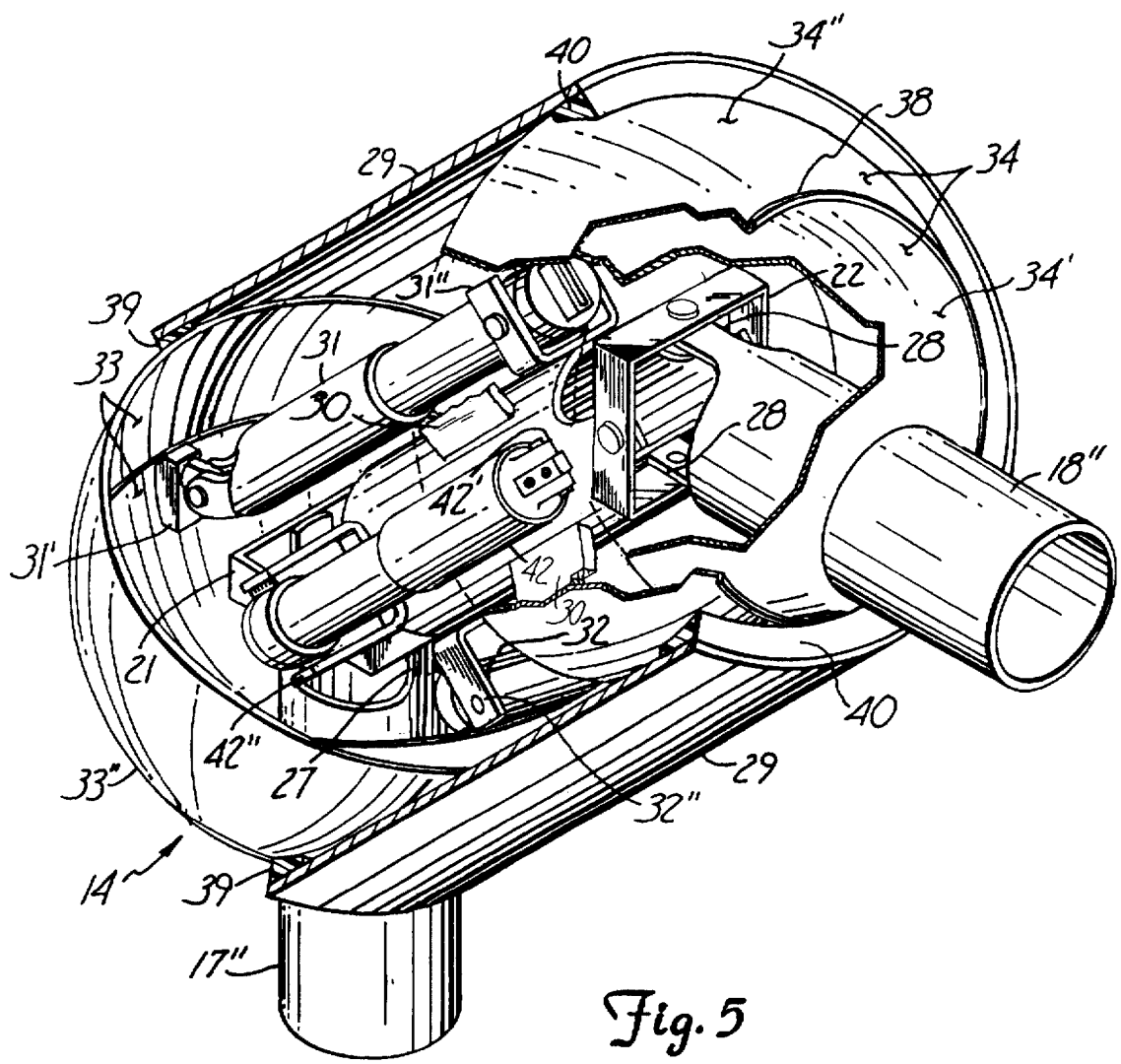
FIG. 5 shows a partially cut-away view of the apparatus of FIGS. 2, 3 and 4.

As can also be seen in FIGS. 2, 3 and 4, not only do movable spherical shell portion arrangements 33 and 34 provide the coupling to force movements of the corresponding support portions protruding therethrough in response to actuation of the corresponding linear actuators, they also complete enclosing the interior space of joint 14 not enclosed by outer tubular enclosure 29. Hence, the interior of joint 14 can be kept relatively free of outside contaminants by the total enclosure formed by outer tubular enclosure 29 and movable spherical shell portion arrangements 33 and 34. This result can be further improved by extending, for instance, a pneumatic hose through the interior of one of the support portions to provide a pressurized atmosphere within joint 14 if even greater contamination avoidance is desired. FIG. 4 shows in dashed line form a hose passing through the open tubular passageways of the support portions, orthogonal pivot structures, and the link structure to carry a liquid past joint 14 to a using location, for instance, paint if joint 14 was used in a spray finishing robot. Such a hose could instead end, or be tapped, in joint 14 and supplied with air under pressure to pressurize its interior volume. Note that truncated versions of electrical control cables, 43 and 44, for operating linear actuators 41 and 42, respectively, are shown also in FIG. 4 to extend through further openings, 23' and 24', in the wall of the tube structure forming central link structure 20 into the tubular passageway therein and further into some (or all if desired) of the tubular passageways through which this hose can extend in joint 14.

Figure 6:
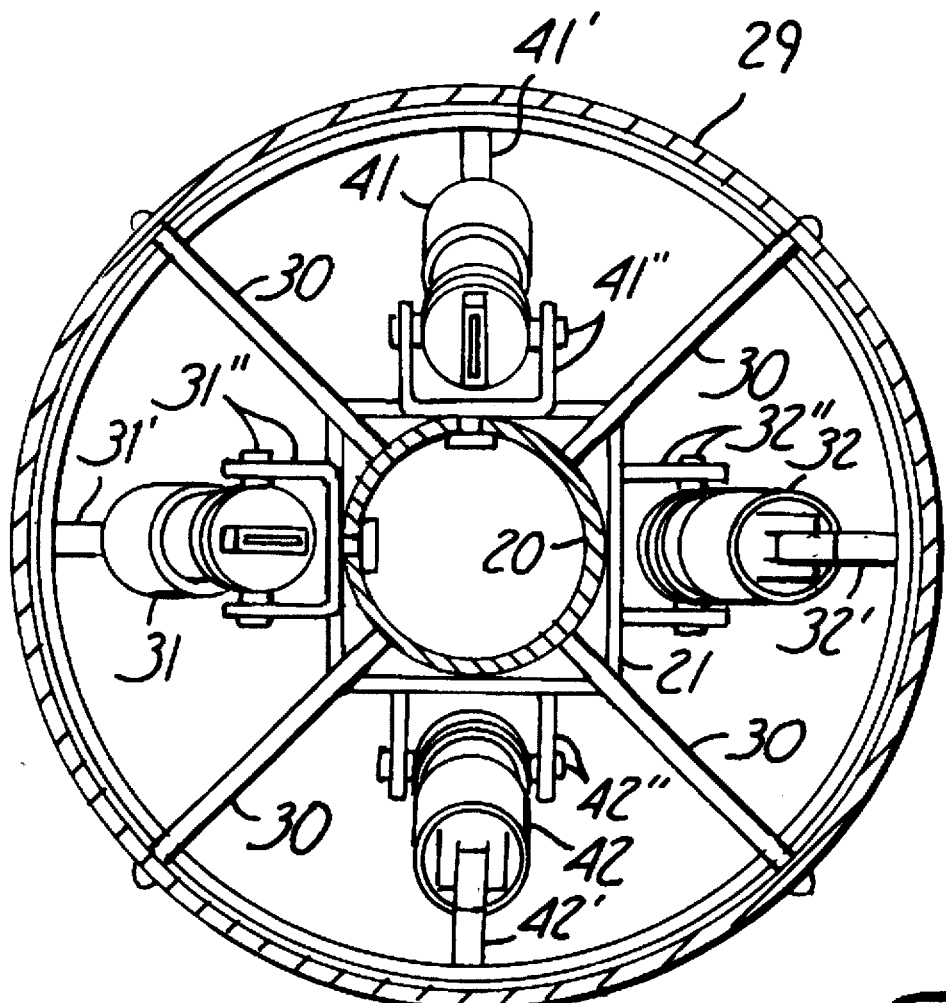
FIG. 6 shows another cross-section view of the apparatus of FIGS. 2, 3 and 4.

As indicated above, the ends of linear actuators 31, 32, 41 and 42 not connected to one of movable spherical shell portion arrangements 33 and 34 are rotatably connected to central link structure 20. Thus, linear actuator 31 has an end thereof rotatably connected to central link structure 20 with a bracket and pivot pin arrangement, 31", with actuator 32 being similarly connected using a bracket and pivot pin arrangement, 32", as shown in FIG. 3. Similarly, linear actuator 41 has an end thereof rotatably connected to central link structure 20 with a bracket and pivot pin arrangement, 41", with actuator 42 being similarly connected using a bracket and pivot pin arrangement, 42", as shown in FIG. 4. FIG. 6 shows a transverse section view of joint 14 looking inwardly from a point just above bracket and pivot pin arrangements 31" and 41" rotatably connecting linear actuators 31 and 41 to central link structure 20. In this view, all four linear actuators 31, 32, 41 and 42 can be seen. Each of bracket and pivot pin arrangements 31", 32", 41" and 42" is capable of permitting the corresponding linear actuator connected thereby to central link structure 20 to not only rotate away from and toward the axis of that link structure on the pins holding the actuator, but also from left to right on the pin holding that bracket and pivot pin arrangement to this link structure.

Keeping the volume of joint 14 relatively small requires the use of linear actuators that are in turn suitably small but with sufficient capability to force movable spherical shell portion arrangements 33 and 34 to selectively move corresponding support portions 17" and 18" to various positions as desired. A suitable linear actuator for such use is described in U.S. Pat. No. 5,117,700 to Trechsel which is hereby incorporated herein by reference.

Figure 7:
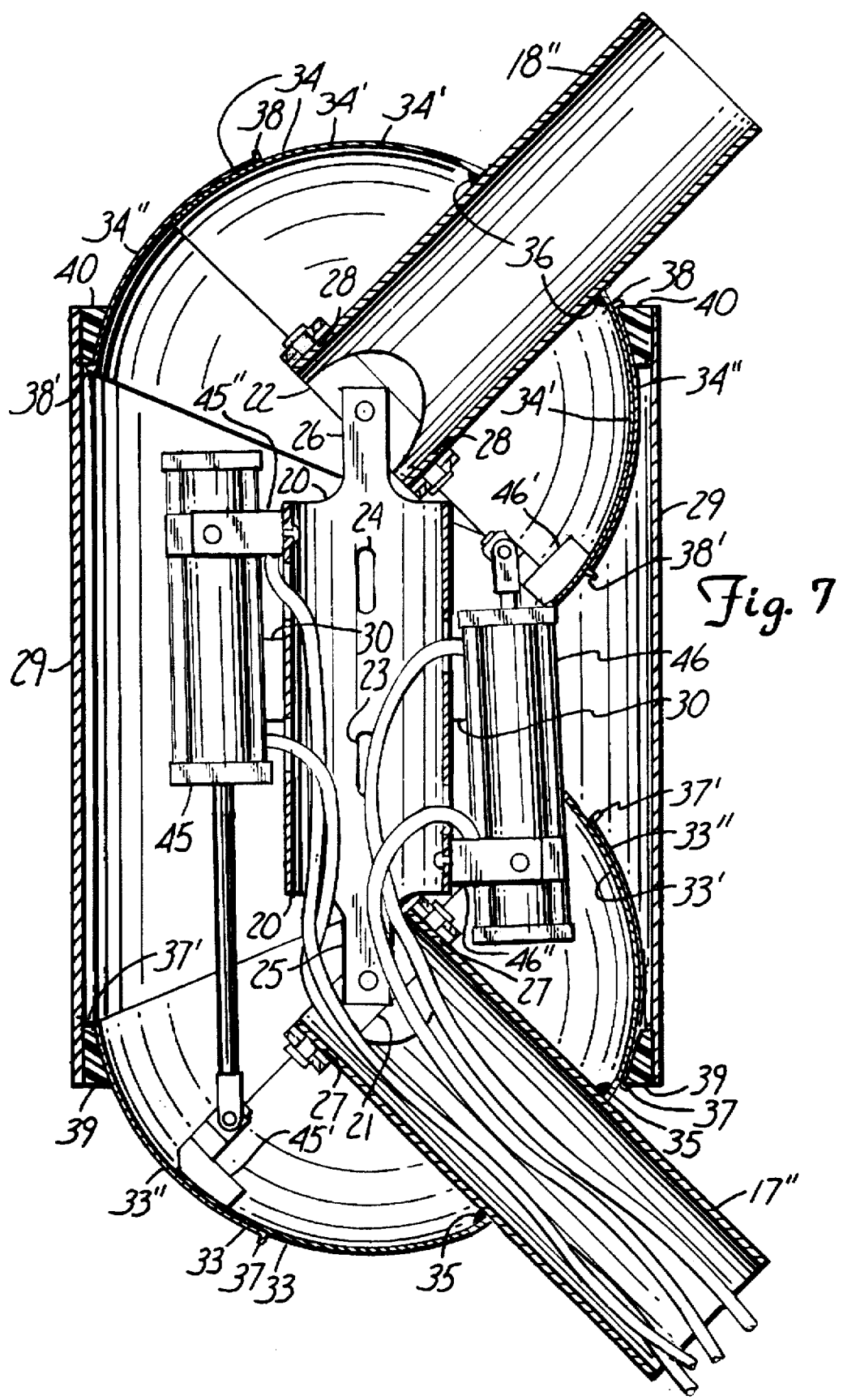
FIG. 7 shows a cross-section view of an alternative for that portion of the apparatus of FIG. 1.

As an alternative to use of such electrically operated linear actuators, pneumatically or hydraulically operated actuators could instead be used in place thereof. Two such actuator replacements, 45 and 46, are shown in FIG. 7, with the hoses carrying the appropriate fluids for operating them shown passing through openings in the wall of the tube structure forming central link structure 20 to thereafter also pass through some or all of the tubular passageways of joint 14. Actuator 45 has its ram mounted to inner spherical shell portion 33' by a mount and pivot pin arrangement, 45', and its cylinder coupled to central link structure 20 by a bracket and pivot pin arrangement, 45". Actuator 46 has its ram mounted to inner spherical shell portion 34' by a mount and pivot pin arrangement, 46', and its cylinder coupled to central link structure 20 by a bracket and pivot pin arrangement, 46". Of course, two further such actuator replacements are also used but are not seen in FIG. 7. Except for these actuator substitutions, the joint of FIG. 7 operates in the same manner as the joint of FIGS. 2, 3, 4, 5 and 6.

Rather than using fluid carrying hoses to control such pneumatic or hydraulic actuators, the structure walls of the tubular components used in connecting structure between support portion 17" and 18" in the joint of FIG. 7 can instead have fluid passageways formed entirely therein which, for any one such component, are coupled at the various rotary joints of which it is a part to the passageways of next component in this connection arrangement. Such an arrangement is shown in part in FIG. 8 where central link structure 20, there redesignated 20' in view of the structural change therein, is shown in part carrying eight small passageways, 47, 48, 49, 50, 51, 52, 53 and 54, enclosed in the walls of the tubular structure thereof except at the passageway ends with four each going to a corresponding member of wall extension pair 26, redesignated in FIG. 8 as 26'. Each of these passageways is, as indicated, contained entirely within the wall of the tube structure forming central link 20' leaving sufficient wall thicknesses therearound to contain the working fluid against the expected fluid pressures except at the ends thereof. At these ends such passageways are connected to other components through the rotary connections between connection arrangement members, or a controlled source of the fluid medium chosen for operating the actuators.

In FIG. 8, the ends of these passageways 47 through 54 are shown just where they connect to the next component in the connection arrangement joining support portions 17" and 18" which is orthogonal pivot structure 22, there redesignated 22'. Pivot structure 22' also has two sets of four small passageways entirely contained within the wall of the square tubular structure thereof, the first set of four of these passageways, 47', 48', 49' and 50', extending from the vicinity of one member of wall extension pair 26' of central link 20 to the vicinity of a member of wall extension pair 28, redesignated in FIG. 8 as 28', as part of support means 18". This latter wall extension member in turn has therein a corresponding set of four small passageways, 47", 48", 49" and 50". In a similar manner, pivot structure 22' has therein a second set of small passageways 51', 52', 53' and 54', extending from the vicinity of the other wall extension member 26' of central link structure 20' to the vicinity of the other wall extension member 28' of support 18". This latter wall extension member also in turn has therein a corresponding set of four small passageways, 51", 52", 53" and 54".

Each of these two sets of passageways in the wall of orthogonal pivot structure 22' are joined, at the opposite ends of the four members thereof where they emerge from that wall, to the passageways in the corresponding one of wall extension members 26' and wall extension members 28' by rotary joints as stated above. These rotary joints, however, permit passage of fluids therethrough between any of the passageways in any of the wall extension members and the corresponding passageway in pivot structure 22'. Thus, passageways 47 through 50 in one of the wall extension members 26' of central link structure 20' are each joined with a corresponding one of passageways 47' through 50' in pivot structure 22' by a multiple fluid passageway joint, 55, which provides a rotatable connection between two sides thereof but still maintains fluid flow correspondence from passageway inlet to passageway outlet for each passageway. These same passageways in pivot structure 22' are each joined to a corresponding one of passageways 47" through 50" in one of the wall extension members 28' of support portion 18" by a further correspondence maintaining multiple fluid passageway, rotatable connection, joint, 56. Similarly, passageways 51 through 54 in the remaining wall extension 26' of central link structure 20' are each joined with a corresponding one of passageways 51' through 54' in pivot structure 22' by another correspondence maintaining multiple fluid passageway, rotatable connection, joint, 57, with these same passageways in pivot structure 22' each being joined with a corresponding one of passageways 51" through 54" in remaining wall extension member 28' of support portion 18" by a final correspondence maintaining multiple fluid passageway, rotatable connection, joint, 58.

An example of one of these correspondence maintaining multiple fluid passageway, rotatable connection, joints is given in the cutaway pictorial view of FIG. 9, the example being for joint 56. As can be seen, joint 56 has an inner rotation member, 59, and an outer casing member, 60, with respect to which rotation member 59 can rotate about the axis of elongation common to each. Such rotation of rotation member 59 occurs with respect to casing 60 on the surfaces of five polymeric "o"-rings, 61, 62, 63, 64 and 65, positioned therebetween, and around inner rotation member 59, these rings being spaced apart from one another to expose passageway openings therebetween. Thus, rotation member 59 is concentrically spaced from casing 60 by "o"-rings 61 through 65 with the space between each of these rings serving as a communication chamber for the corresponding one of the passageways provided in rotation member 59 and the corresponding one of the passageways provided in casing 60. Thus, the communication chamber formed between "o"-rings 64 and 65 by member 59 and casing 60 serves to connect a corresponding passageway, 50'", in rotation member 59 with a corresponding passageway, 50"", in casing 60. Inner rotation member 59 has three other passageways shown therein, 47'", 48'" and 49'". There are a corresponding three further passageways in casing member 60 but which cannot be seen in the view of FIG. 9. Hence, even during rotation, fluid under pressure in one of the passageways in rotation member 59 will transmit that pressure to fluid in the corresponding one of the passageways in casing 60. As a result, the pressure of a fluid in one of the passageways in rotation member 22' will, through its corresponding passageways in inner rotation member 59 casing 60, transmit pressure on the fluid therein to the fluid in the corresponding one of the passageways in wall extension 28'.

Thus, internal hoses need not be provided through the tubular passageways in the components connected between support portions 17" and 18" to transmit fluid under pressure from the vicinity of central link structure 20' to the far opposite end of support portion 18". A similar arrangement can be used to provide fluid pressure from the far opposite end of support portion 17" to the vicinity of central link structure 20'. This allows use of pneumatic and hydraulic actuators without the necessity of filling the tubular passageways of the connection arrangement between support portion 17" and 18" with hoses to control these actuators, the volume of which would reduce the opportunities for other hoses or control cables to pass through these same tubular passageways to a tool effector at the end of the robot arm such as for paint spraying.

Figure 11:
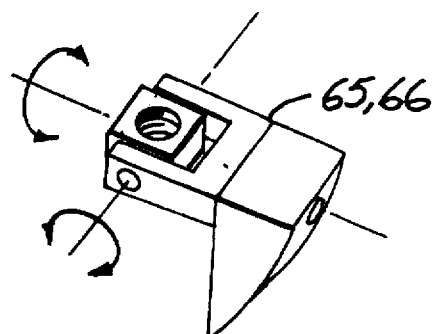
FIG. 11 shows a pictorial view of a portion of the apparatus of FIG. 10.

A further alternative for providing actuators in joint 14 is shown in FIG. 10. Rather than providing four separate actuators, two for positioning support portion 17" with respect to central link 20 and two for positioning support portion 18" with respect to the same, the system of FIG. 10 provides just two screw actuators. One of these actuators, 61, can be seen in FIG. 10 but the remaining one is obscured by central link structure 20. Actuator 61 is a differential screw arrangement which has an outer member rotatable by an electric motor, 62, through drive train formed by a flexible elastic drive belt, 63, and a pair of pulleys, 64, of which one is on motor 62 and the other on the outer member of actuator 61 positioned there in a restraining bracket, 64', which limits movement of that pulley parallel to the axis of link 20 but not transverse thereto. When so rotated, actuator 61 will simultaneously move both inner spherical shell portions 33' and 34' to thereby simultaneously change the positioning of both support portions 17" and 18". Actuator 61 is connected to inner spherical shell portion 33' at the truncation edge thereof by a mount and pivot pin arrangement, 65, and is connected to the truncation edge of inner spherical shell portion 34' by a further mount and pivot pin arrangement, 66. Each of mount and pivot pin arrangements 65 and 66 have a threaded nut therein which is connected by corresponding pivot pins to the mount which is directly in contact with the corresponding one of inner spherical shell portions 33' and 34'. Mount and pivot pin arrangements 65 and 66 are shown in more detail in FIG. 11.

Figure 12:
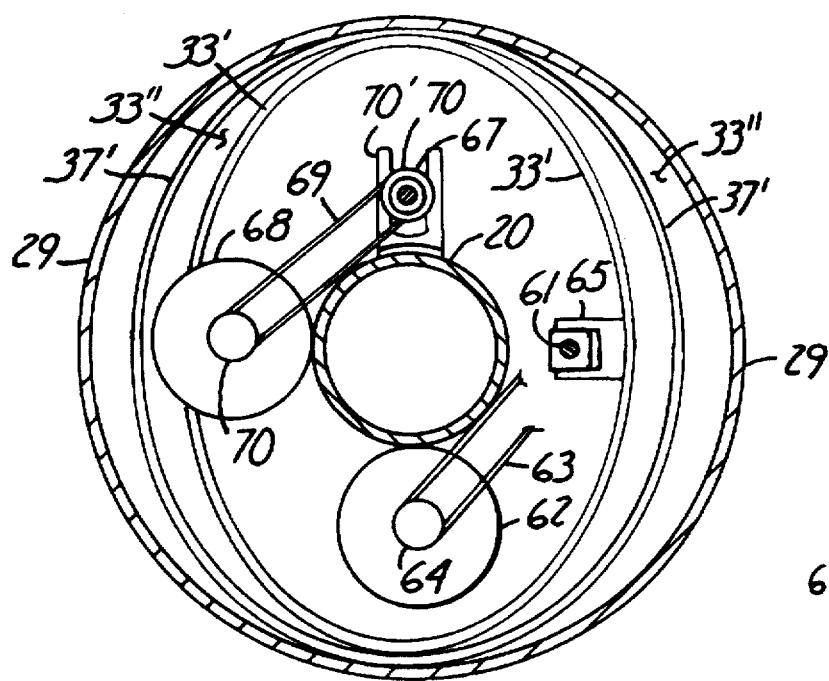
FIG. 12 shows a cross-section view of a portion of the apparatus of FIG. 10.

As indicated in FIG. 10, an offset transverse section view is provided in FIG. 12. As a result, a second screw actuator, 67, can be seen in cross-section which in turn is rotatable by a further electric motor, 68, again through use of a flexible elastic belt, 69, and a pair of pulleys, 70, of which one here too is on motor 68 and the other on the outer member of actuator 67 positioned there in a restraining bracket, 70', which limits movement of that pulley parallel to the axis of link 20 but not transverse thereto. In FIG. 12, differential screw 61 can simultaneously move the truncation edges of inner spherical shell portions 33' and 34' where it is attached, causing each such edge to move inward and outward with respect to the plane of that figure to thereby cause support portions 17" and 18" coupled to these spherical shell portions, although not shown, to correspondingly move either toward the left or the right in the view of that figure. Similarly, screw actuator 67 is formed with a differential screw that can cause the truncated edges of spherical shell portions 33' and 34', where it is attached, to move inward and outward with respect to the plane of that figure to effectively cause corresponding support portions 17" and 18" to move downward and upward in the view of that figure.

Figure 13:
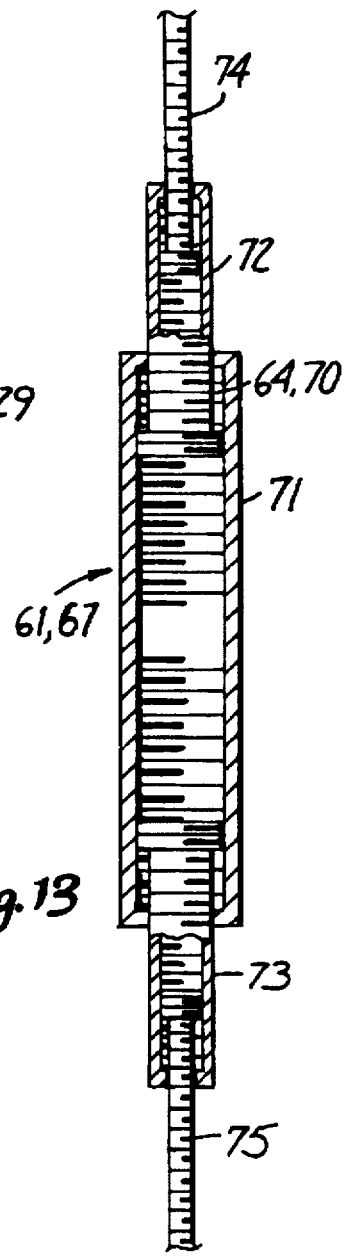
FIG. 13 shows a cross-section view of a portion of the apparatus of FIG. 10.

FIG. 13 shows a cross-section view of either of differential screws 61 or 67 with the corresponding member of one of pulley pairs 64 and 70 as the outermost radial structure thereof. Such a pulley member is fixedly attached to an exterior surface of an outer sleeve, 71, which is interiorly threaded at one diameter over most of its interior surface but at a smaller diameter on the two inset interior surfaces provided on the interior surfaces of the smaller openings in the reduction end caps located at each end thereof.

Within outer sleeve 71 are two further inner sleeves, 72 and 73, both of which are threaded on most of the outer surfaces thereof at one diameter to engage the threads on the inset interior surfaces of the reduction end caps of outer sleeve 71. In addition, the outer surfaces of the inner sleeves are also threaded at a larger diameter in the portion thereof provided by the outer surfaces of the expansion end cap of each interior sleeve provided at the interior end thereof to engage the threading prevalent over most of the interior surface of outer sleeve 71. The interior surfaces of each of interior sleeves 71 and 72 are interiorly threaded at one diameter over most of the interior surface thereof but at a smaller diameter on an inset interior surface provided on the interior surface of the smaller opening in the reduction end cap located at the end thereof (the exterior end) opposite that with the expansion end cap thereon.

Within each of inner sleeves 72 and 73 are corresponding threaded rods, 74 and 75, respectively, each of which has an expansion end cap on each of its ends. Each of threaded rods 74 and 75 are threaded on most of the outer surfaces thereof at one diameter to engage the threads on the inset interior surface of the reduction end cap of the corresponding inner sleeve in which it is provided. In addition, the outer surface of each rod is also threaded at a larger diameter on the portion thereof provided by the outer surface of the expansion end cap of each rod located at the interior end thereof to engage the threading prevalent over most of the interior surface of the inner sleeve in which it is provided.

Under rotation of the pulley on outer sleeve 71, that sleeve will also rotate causing either the inner sleeves or the rods therein to also rotate, depending on which as the least frictional force hindering rotation thereof. In one direction of such rotation, the threading is such that the exterior ends of the rods will recede from outer sleeve 71, and such that rotation in the other direction will lead to these exterior rod ends approaching outer sleeve 71. Sufficient rotation to cause an end cap on one component to reach an end cap of another results in the latter end cap becoming a stop and a transferor of torque to the component of which it is a part. Thus, the rods and inner sleeves "telescope" into and out of outer sleeve 71 under rotation of that latter sleeve to have a relatively short extent if support portions 17" and 18" are pulled over them, as caused by such a short extension thereof in having the exterior rod ends connected to the corresponding one of inner spherical shell portions 33' and 34' through mount and pivot pin arrangements 65 and 66, respectively, and a relatively long extent if support portions 17" and 18" are pushed by them away from them.

Although the present invention has been described with reference to preferred embodiments, workers skilled in the art will recognize that changes may be made in form and detail without departing from the spirit and scope of the invention.

What is claimed is:

1. Robotic apparatus including first robotic manipulator having an initial manipulable support and a complement manipulable support on different sides thereof, said first manipulator comprising:

a link structure;

an initial pivot connector rotatably connected to said link structure about a first axis and further rotatably connected to said initial manipulable support about a second axis oriented angularly to said first axis;

a complement pivot connector rotatably connected to said link structure about a third axis, and further rotatably connected to said complement manipulable support about a fourth axis oriented angularly to said third axis; and first initial and first complement actuators each having a pair of body portions therein which can selectively be caused to approach and separate from one another, said first initial actuator having one of said pair of body portions thereof coupled to said link structure and having that said body portion thereof remaining coupled to said initial manipulable support independently of said initial and complement pivot connectors, said first complement actuator having one of said pair of body portions thereof coupled to said link structure and having that said body portion thereof remaining coupled to said complement manipulable support independently of said initial and complement pivot connectors.

2. The apparatus of claim 1 wherein said link structure has an enclosure thereabout having a complement opening therein to permit said complement manipulable support to emerge therefrom, said first complement actuator being coupled to said complement manipulable support by a complement shell movable with respect to said enclosure and with said complement shell having an opening therein to permit said complement manipulable support to emerge therefrom but otherwise substantially covering said enclosure complement opening.

3. The apparatus of claim 1 wherein said first and second axes of said initial pivot connector are substantially orthogonal to one another and said third and fourth axes of said complement pivot connector are substantially orthogonal to one another, and wherein those two locations at which said coupling of said first initial actuator means to said link structure and said coupling of said first complement actuator to said link structure, along with that pivot connector direction established between said rotatable connections of said initial and complement pivot connectors to said link structure, define a first link-actuator plane; and further comprising second initial and second complement actuators each having a pair of body portions therein which can selectively be caused to approach and separate from one another, said second initial actuator having one of said pair of body portions thereof coupled to said link structure and that said body portion thereof remaining coupled to said initial manipulable support, and said second complement actuator having one of said pair of body portions thereof coupled to said link structure and that said body portion thereof remaining coupled to said complement manipulable support, such that said coupling of said second initial actuator to said link structure and said coupling of said second complement actuator to said link structure, along with said pivot connection direction, establish a second link-actuator plane which is substantially orthogonal to said first link-actuator plane.

4. The apparatus of claim 1 wherein those said body portions of said first initial and first complement actuators coupled to said link structure together form a common differential screw threaded shell which is coupled to said link structure at a location at which is provided a rotary motion generation means which can selectively rotate a selected member of a rotary motion drive train means, said coupling between said common differential screw threaded shell and said rotary motion generation means being provided by said rotary motion drive train means.

5. The apparatus of claim 1 wherein said initial and complement manipulable supports, said initial and complement pivot connectors and said link structure each have an interior passageway therethrough such than an elongated flexible structure can extend commonly through all of them.

6. The apparatus of claim 1 wherein said link structure is at least in part a tube-like structure formed by a tubular wall about an interior passageway with that said tubular wall having at least one tubular passageway therein which opens to neither said interior passageway thereof nor to exterior regions immediately outside said link structure tubular wall opposite that said interior passageway; and wherein said complement manipulable support is at least in part a tube-like structure formed by a tubular wall about an interior passageway with that said tubular wall having at least one tubular passageway therein which opens to neither said interior passageway thereof nor to exterior regions outside said complement manipulable support tubular wall opposite that said interior passageway; and wherein said complement pivot connector is at least in part a tube-like structure formed by a tubular wall about an interior passageway with that said tubular wall having at least one tubular passageway therein which opens to neither said interior passageway thereof nor to exterior regions outside said complement pivot connector tubular wall opposite that said interior passageway; and further wherein said link structure means and said complement pivot connector are rotatably connected as aforesaid by a rotatable connection which permits said link structure tubular passageway to maintain communication with said complement pivotal connector tubular passageway, and said complement pivot connector and said complement manipulable support are rotatably connected as aforesaid by a rotatable connection which permits said complement pivot connector tubular passageway to maintain communication with said complement manipulable support tubular passageway.

7. The apparatus of claim 1 wherein said first initial and first complement actuators are each a linear actuator.

8. The apparatus of claim 1 further comprising a second robotic manipulator having an initial manipulable support joined with said first robotic manipulator complement manipulable support without having motors in or on these joined supports for operating either of said first and second robotic manipulators.

9. The apparatus of claim 2 wherein said complement shell is formed by both an inner complement shell and an outer complement shell positioned against one another with said outer complement shell being slidable over said inner complement shell, said inner and outer complement shells each having a hole therein to permit said complement manipulable support to emerge therefrom as aforesaid but with said outer complement shell having a hole of a substantially greater size than that in said inner complement shell, said first complement actuator being rotatably connected to said inner complement shell means.

10. The apparatus of claim 2 wherein said enclosure also has an initial opening therein to permit said initial manipulable support to emerge therefrom, said first initial actuator being coupled to said initial manipulable support by an initial shell movable with respect to said enclosure and with said initial shell having an opening therein to permit said initial manipulable support to emerge therefrom but otherwise substantially covering said enclosure initial opening.

11. The apparatus of claim 3 wherein said first and second initial actuator and said first and second complement actuators are each a linear actuator.

12. The apparatus of claim 4 wherein said body portion of said first initial actuator coupled to said initial manipulable support is coupled thereto at least in part by a rotatably mounted threaded nut, and wherein said body portion of said first complement actuator coupled to said complement manipulable support is coupled thereto at least in part by a rotatably mounted threaded nut.

13. The apparatus of claim 5 wherein said interior passageways can also accommodate control interconnections therethrough for said first initial and said first complement actuators.

14. The apparatus of claim 8 wherein said second robotic manipulator has said initial manipulable support and a complement manipulable support on different sides thereof, said second manipulator comprising:

a link structure;
an initial pivot connector rotatably connected to said link structure about a first axis and further rotatably connected to said initial manipulable support about a second axis oriented angularly to said first axis;
a complement pivot connector rotatably connected to said link structure about a third axis, and further rotatably connected to said complement manipulable support about a fourth axis oriented angularly to said third axis; and
first initial and first complement actuators each having a pair of body portions therein which can selectively be caused to approach and separate from one another, said first initial actuator having one of said pair of body portions thereof coupled to said link structure and having that said body portion thereof remaining coupled to said initial manipulable support, said first complement actuator having one of said pair of body portions thereof coupled to said link structure and having that said body portion thereof remaining coupled to said complement manipulable support.

15. The apparatus of claim 9 wherein said outer complement shell is retained within said enclosure at said enclosure complement opening by a complement seal positioned around an interior edge of said enclosure complement opening, said outer complement shell having lips protruding outwardly both at an edge of said hole therein that permits said complement manipulable support to emerge therefrom and at an edge of another opening across therefrom in said outer complement shell.

16. The apparatus of claim 10 wherein said initial shell is formed by both an inner initial shell and an outer initial shell positioned against one another with said outer initial shell being slidable over said inner initial shell, said inner and outer initial shell each having a hole therein to permit said initial manipulable support to emerge therefrom as aforesaid but with said outer initial shell having a hole of a substantially greater size than that in said inner initial shell, said first complement actuator being rotatably connected to said inner initial shell.

17. The apparatus of claim 14 wherein said second manipulator link structure has a second manipulator enclosure thereabout having a complement opening therein to permit said second manipulator complement manipulable support to emerge therefrom, said second manipulator first complement actuator being coupled to said second manipulator complement manipulable support by a second manipulator complement shell movable with respect to said second manipulator enclosure and with said second manipulator complement shell having an opening therein to permit said second manipulator complement manipulable support to emerge therefrom but otherwise substantially covering said second manipulator enclosure complement opening.

18. The apparatus of claim 14 wherein those two locations at which said coupling of said second manipulator first initial actuator to said second manipulator link structure and said coupling of said second manipulator first complement actuator to said manipulator link structure, along with that pivot connector direction established between said rotatable connections of said second manipulator initial and complement orthogonal pivot connectors to said second manipulator link structure, define a first link-actuator plane, and further comprising second manipulator second initial and second complement actuators each having a pair of body portions therein which can selectively be caused to approach and separate from one another, said second manipulator second initial actuator having one of said pair of body portions thereof coupled to said second manipulator link structure and that said body portion thereof remaining coupled to said second manipulator initial manipulable support, and said second manipulator second complement actuator having one of said pair of body portions thereof coupled to said second manipulator link structure and that said body portion thereof remaining coupled to said second manipulator complement manipulable support, such that said coupling of said second manipulator second initial actuator to said second manipulator link structure and said coupling of said second manipulator second complement actuator to said second manipulator link structure, along with said pivot connection direction, establish a second link-actuator which is substantially orthogonal to said first link-actuator plane.

19. The apparatus of claim 14 wherein those said, body portions of said second manipulator first initial and first complement actuators coupled to said second manipulator link structure together form a common second manipulator differential screw threaded shell which is coupled to said second manipulator link structure at a location at which is provided a second manipulator rotary motion generation means which can selectively rotate a selected member of a second manipulator rotary motion drive train means, said coupling between said common second manipulator differential screw threaded shell and said second manipulator rotary motion generation means being provided by said second manipulator rotary motion drive train means.

20. The apparatus of claim 14 wherein said second manipulator initial and complement manipulable supports, said second manipulator initial and complement pivot connectors, and said second manipulator link structure each have an interior passageway therethrough such that an elongated flexible structure can extend commonly through all of them.

21. The apparatus of claim 16 wherein said outer initial shell is retained within said enclosure at said enclosure initial opening by an initial seal positioned around an interior edge of said enclosure initial opening, said outer initial shell having lips protruding outwardly both at an edge of said hole therein that permits said initial manipulable support to emerge therefrom and at an edge of another opening across therefrom in said outer initial shell.

22. A first robotic manipulator having an initial manipulable support, said first manipulator comprising:
 a base structure;
 an initial pivot connector rotatably connected to said base structure about a first axis and further rotatably connected to said initial manipulable support about a second axis oriented angularly to said first axis; and
 first and second initial actuators each having a pair of body portions therein which can selectively be caused to approach and separate from one another, said first and second initial actuators each having one of said pair of body portions thereof coupled to said base structure and each having that said body portion thereof remaining coupled to said initial manipulable support independently of said initial pivot connector so as to have each of said first and second initial actuators be able to move said initial manipulable support in a direction corresponding thereto that is substantially orthogonal to said corresponding direction of movement of that remaining other actuator.

23. The manipulator of claim 22 wherein said base structure has an enclosure thereabout having an initial opening therein to permit said initial manipulable support to emerge therefrom, said first and second initial actuators being coupled to said initial manipulable support by an initial shell movable with respect to said enclosure and with said initial shell having an opening therein to permit said initial manipulable support to emerge therefrom but otherwise substantially covering said enclosure initial opening.

24. The manipulator of claim 22 wherein said initial manipulable support, said initial orthogonal pivot connector, and said base structure each have an interior passageway therethrough such that an elongated flexible structure can extend commonly through all of them.

25. The manipulator of claim 23 wherein said initial shell is formed by both an inner initial shell and an outer initial shell positioned against one another with said outer initial shell being slidable over said inner initial shell, said inner and outer initial shells each having a hole therein to permit said initial manipulable support to emerge therefrom as aforesaid, but with said outer initial shell having a hole of a substantially greater size than that in said inner initial shell, said first and second initial actuators each being rotatably connected to said inner initial shell means.

26. The manipulator of claim 25 wherein said outer initial shell is retained within said enclosure at said enclosure initial opening by an initial seal positioned around an interior edge of said enclosure initial opening, said outer initial shell having lips protruding outwardly both at an edge of said hole therein that permits said initial manipulable support to emerge therefrom and at an edge of another opening across therefrom in said outer initial shell.

27. Robotic apparatus including first robotic manipulator having an initial manipulable support and a complement manipulable support on different sides thereof, said first manipulator comprising:
 a link structure;
 an initial pivot connector rotatably connected to said link structure about a first axis and further rotatably connected to said initial manipulable support about a second axis oriented angularly to said first axis;
 a complement pivot connector rotatably connected to said link structure about a third axis, and further rotatably connected to said complement manipulable support about a fourth axis oriented angularly to said third axis; and
 first initial and first complement actuators each having a pair of body portions therein which can selectively be caused to approach and separate from one another, said first initial actuator having one of said pair of body portions thereof coupled to said link structure so as to limit translation of that said body portion in all directions with respect to said link structure and having that said body portion thereof remaining coupled to said initial manipulable support, said first complement actuator having one of said pair of body portions thereof coupled to said link structure so as to limit translation of that said body portion in all directions with respect to said link structure and having that said body portion thereof remaining coupled to said complement manipulable support.

28. A first robotic manipulator having an initial manipulable support, said first manipulator comprising:
 a base structure;
 an initial pivot connector rotatably connected to said base structure about a first axis and further rotatably connected to said initial manipulable support about a second axis oriented angularly to said first axis; and
 first and second initial actuators each having a pair of body portions therein which can selectively be caused to approach and separate from one another, said first and second initial actuators each having one of said pair of body portions thereof coupled to said base structure so as to limit translation of that said body portion in all directions with respect to said base structure and each having that said body portion thereof remaining coupled to said initial manipulable support so as to have each of said first and second initial actuators be able to move said initial manipulable support in a direction corresponding thereto that is substantially orthogonal to said corresponding direction of movement of that remaining other actuator.

* * * * *